(12) United States Patent
Wang et al.

(10) Patent No.: US 10,890,839 B1
(45) Date of Patent: Jan. 12, 2021

(54) STRUCTURED LIGHT IMAGING DEVICE

(71) Applicant: HIMAX TECHNOLOGIES LIMITED, Tainan (TW)

(72) Inventors: Ching-Wen Wang, Tainan (TW); Cheng-Che Tsai, Tainan (TW); Tsai-Hsing Chen, Tainan (TW); Seng-Yu Huang, Tainan (TW); Wei-Cheng Lu, Tainan (TW); Hsueh-Tsung Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/676,407

(22) Filed: Nov. 6, 2019

(51) Int. Cl.
*G01B 11/25* (2006.01)
*G03B 21/20* (2006.01)
*G03B 21/14* (2006.01)
*G03B 21/00* (2006.01)

(52) U.S. Cl.
CPC ........ *G03B 21/208* (2013.01); *G01B 11/2513* (2013.01); *G03B 21/142* (2013.01); *G03B 21/2033* (2013.01); *G03B 21/005* (2013.01)

(58) Field of Classification Search
CPC ................ G01B 11/2513; G01B 11/25; G02B 27/4233; G02B 27/60; G02B 27/42
See application file for complete search history.

(56) References Cited

U.S. PATENT DOCUMENTS

| | | | |
|---|---|---|---|
| 2013/0038941 A1* | 2/2013 | Pesach | G02B 27/0905 359/619 |
| 2013/0088723 A1* | 4/2013 | Feldkhun | G01B 9/02041 356/498 |
| 2014/0307055 A1* | 10/2014 | Kang | H04N 9/045 348/47 |

\* cited by examiner

*Primary Examiner* — Ryan D Howard
(74) *Attorney, Agent, or Firm* — CKC & Partners Co., LLC

(57) ABSTRACT

The structured light imaging device includes a projector including a diffractive optical element, an image sensor, and a processing circuit. The processing circuit is configured to control the projector to emit a beam having a special pattern, and alter an amplitude of the beam during a sensing period. The image sensor is configured to capture an image corresponding to the beam during the sensing period, and transmits the image to the processing circuit. The processing circuit calculates a depth according to the image and a predetermined image having the special pattern. Therefore, the interference phenomenon is reduced.

4 Claims, 8 Drawing Sheets

STRUCTURED LIGHT IMAGING DEVICE

BACKGROUND

Field of Invention

The present invention relates to a structured light imaging device in which interference of light wave is reduced.

Description of Related Art

Structured light scanning is a technology to calculate the depths of a field of view. Light with a special pattern is projected onto an object, and then an image sensor captures an image of the object. The depths of the object are calculated by analyzing the captured image. However, when the special pattern is projected onto the object, it may be disturbed by many factors, causing a change in the brightness of the special pattern, which in turn affects the calculation of the depth. How to improve the depth calculation is a topic of interest to those skilled in the art.

SUMMARY

Embodiments of the invention provide a structured light imaging device including a projector including a diffractive optical element, an image sensor, and a processing circuit electrically connected to the projector and the image sensor. The processing circuit is configured to control the projector to emit a beam having a special pattern, and alter an amplitude of the beam during a sensing period. The image sensor is configured to capture an image corresponding to the beam during the sensing period, and transmits the image to the processing circuit. The processing circuit calculates a depth according to the image and a predetermined image having the special pattern.

In some embodiments, the projector further includes a projection lens, a collection lens, a beam homogenizer, and a laser source. The diffractive optical element is disposed between the projection lens and the collection lens. The beam homogenizer is disposed between the laser source and the collection lens.

In some embodiments, the processing circuit includes a driving circuit electrically connected to the projector, and a processor electrically connected to the driving circuit and the image sensor.

In some embodiments, the processor transmits a control signal to the driving circuit to alter the amplitude of the beam at a maximum frequency allowed by the driving circuit.

In some embodiments, the processing circuit alters the amplitude of the beam in a random way during the sensing period.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

Figure 1:
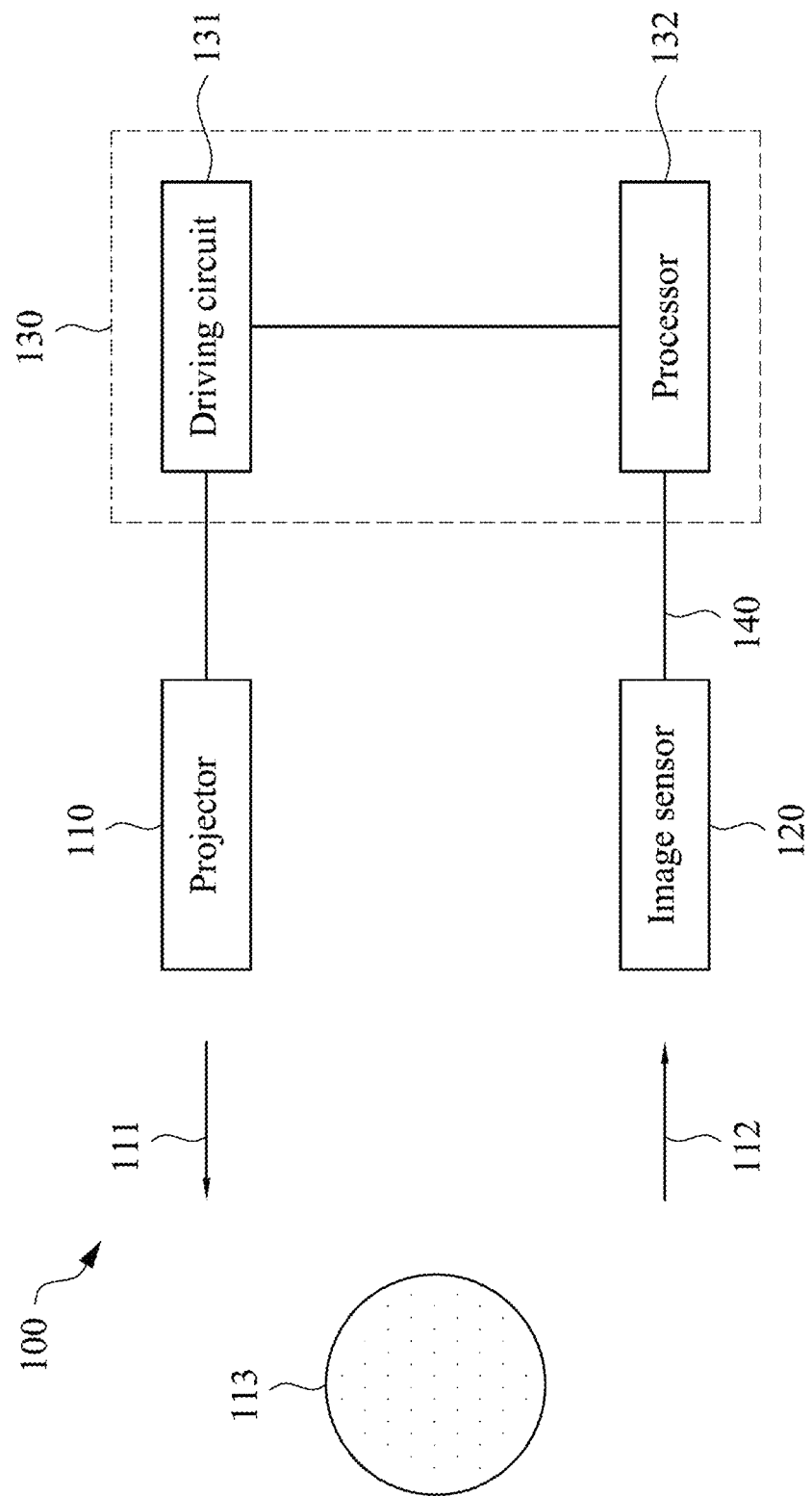
FIG. 1 is schematic diagram illustrating a structured light imaging device in accordance with an embodiment.

FIG. 1 is schematic diagram illustrating a structured light imaging device in accordance with an embodiment. Referring to FIG. 1, a structured light imaging device 100 includes a projector 110, an image sensor 120, and a processing circuit 130 which is electrically connected to the projector 110 and the image sensor 120. The processing circuit 130 controls the projector 110 to emit a beam 111 having a special pattern which may include multiple dots or lines, but the invention is not limited thereto. The beam 111 is projected onto an object 113. The image sensor 120 senses the light 112 from the object 113 to capture an image corresponding to the beam 111. In other words, the captured image also has the special pattern. The special pattern in the captured image may be shifted due to the depths variation of the object 113, and therefore the depths of the object 113 can be calculated according to the shift of the special pattern. In particular, the processing circuit 130 would control the projector 110 to alter the amplitude of the beam 111 during a sensing period of the image sensor 120 so as to reduce effect of interference which will be described in detail below.

Figure 2:
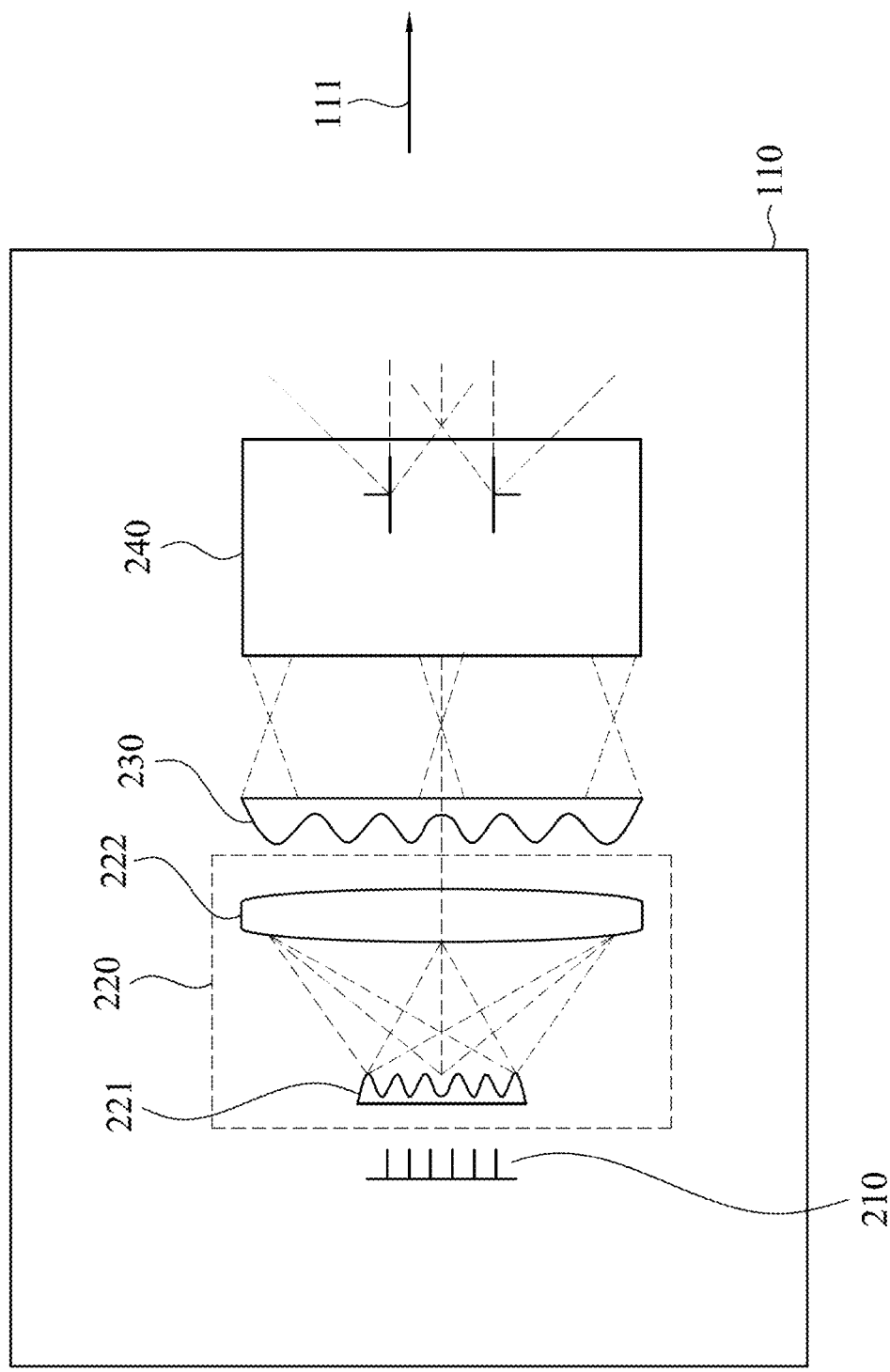
FIG. 2 is a schematic diagram illustrating a projector in accordance with an embodiment.

FIG. 2 is a schematic diagram illustrating a projector in accordance with an embodiment. In some embodiments, the projector 110 includes a laser source 210, a beam homogenizer 221, a collection lens 222, a diffractive optical element (DOE) 230, and a projection lens 240. The laser source 210 may be a Vertical Cavity Surface Emitting Laser (VCSEL) or other suitable laser source. The laser emitted by the laser source 210 may be infrared light which wavelength is in a range from 700 nm to 1000 nm. In other embodiments, the laser emitted by the laser source 210 may also be visible light. The beam homogenizer 221 and the collection lens 222 are collectively referred to a wafer level optics (WLO) 220 including one or multiple substrates on which the beam homogenizer 221 and the collection lens 222 are formed. The beam homogenizer 221 is configured to enlarge the cross-sectional area of the laser so that the cross-sectional area of the laser can cover the following components. The collection lens 222 is configured to collimate the laser into parallel light. The diffractive optical element 230 has gratings. After the laser passes through the diffractive optical element 230, the laser will have a special pattern due to the diffraction principle. The laser having the special pattern would pass through the projection lens 240 to produce the beam 111. In FIG. 2, the diffractive optical element 230 is disposed between the projection lens 240 and the collection lens 222. The beam homogenizer 221 is disposed between the laser source 210 and the collection lens 222. However, FIG. 2 is merely an example. The components of the projector 110 may have another arrangement in other embodiments. For example, one or more components of the projector 110 may be omitted or arranged in a different sequence. In addition, the collection lens 222 and the projection lens 240 may be convex lens, concave lens, or a combination thereto, which is not limited in the invention.

Referring to FIG. 1, the image sensor 120 includes Charge-coupled Device (CCD) sensors, Complementary Metal-Oxide Semiconductor (CMOS) sensors, or other suitable optical sensors. The image sensor 120 senses infrared light in the embodiment, but it may also sense visible light in other embodiments. The processing circuit 130 includes a driving circuit 131 and a processor 132. The driving circuit 131 serves as a driver of the projector 110. The processor 132 may be a microprocessor, a microcontroller, a digital signal processor, an image processing chip, an application-specific integrated circuit, etc. In some embodiments, the driving circuit 131 and the processor 132 are integrated into a circuit which is not limited in the invention.

Figure 3:
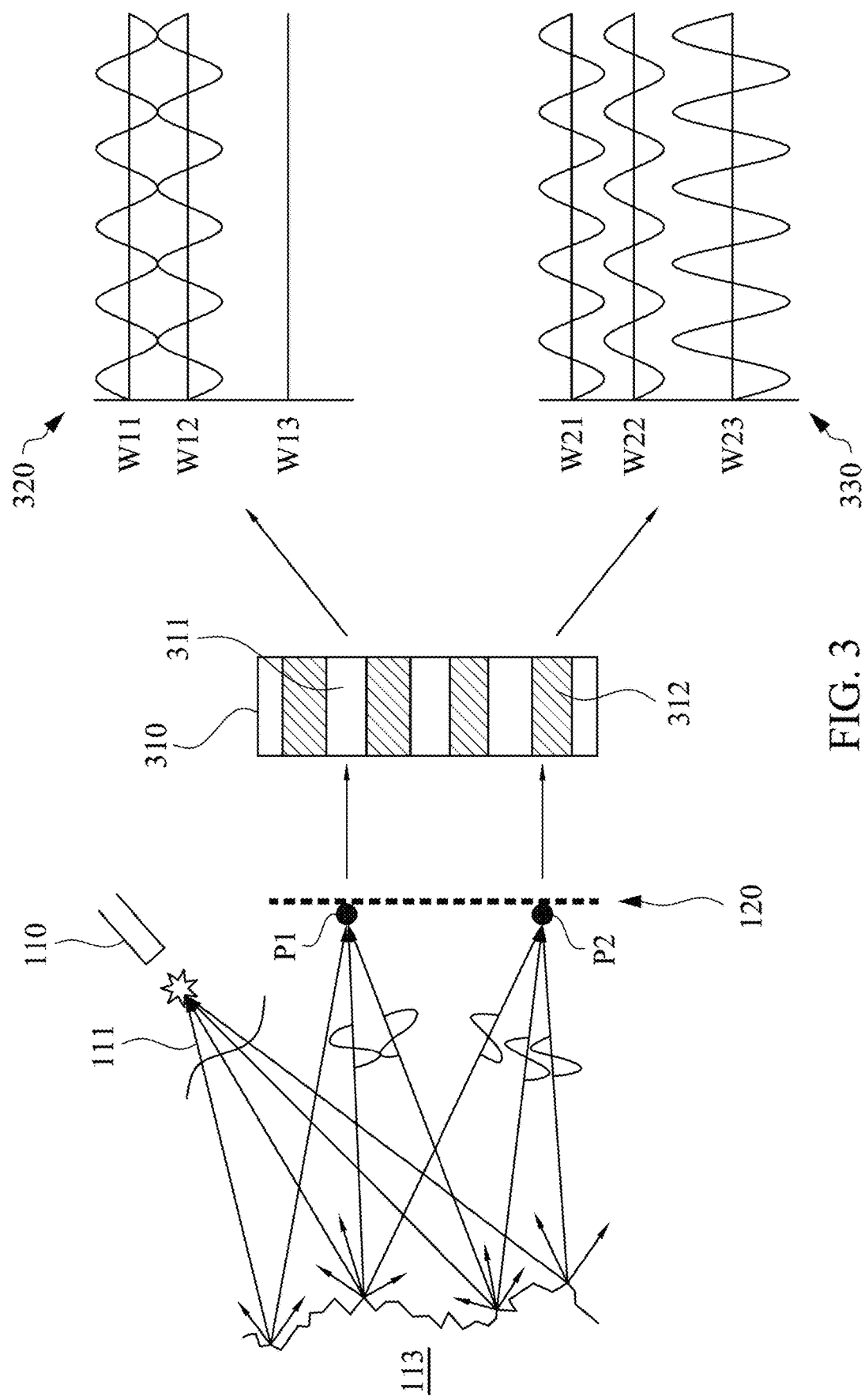
FIG. 3 is a schematic diagram illustrating interference phenomenon in accordance with an embodiment.

FIG. 3 is a schematic diagram illustrating interference phenomenon in accordance with an embodiment. Referring to FIG. 3, the projector 110 emits the beam 111 to the object 113 which reflects the beam 111 to the image sensor 120. However, different waves may arrive at the image sensor 120 at different time, resulting in constructive interference or destructive interference. Two pixels P1 and P2 of the image sensor 120 are taken as examples herein. The image captured by the image sensor 120 has a special pattern 310 with a bright region 311 and a dark region 312. The pixel P1 locates in the bright region 311, and the pixel P2 locates in the dark region 312. Two waves W11 and W12 arriving at the pixel P1 are shown in a diagram 320 in which the horizontal axis is time and the vertical axis is the amplitude of the waves. A wave W13 represents the sum of the two waves W11 and W12 showing that the destructive interference occurs. In this case, the brightness of the bright region 311 is decreased. Moreover, two waves W21 and W22 arriving at the pixel P2 are shown in a diagram 330. A wave W23 represents the sum of the two waves W21 and W22 showing that the constructive interference occurs. In this case, the brightness of the dark region 312 is increased. The ratio of the highest brightness to the lowest brightness is called signal to noise ratio (SNR) which is decreased in the situation of FIG. 3, and therefore the depth calculated based on the special pattern 310 may have some errors.

Figure 4:
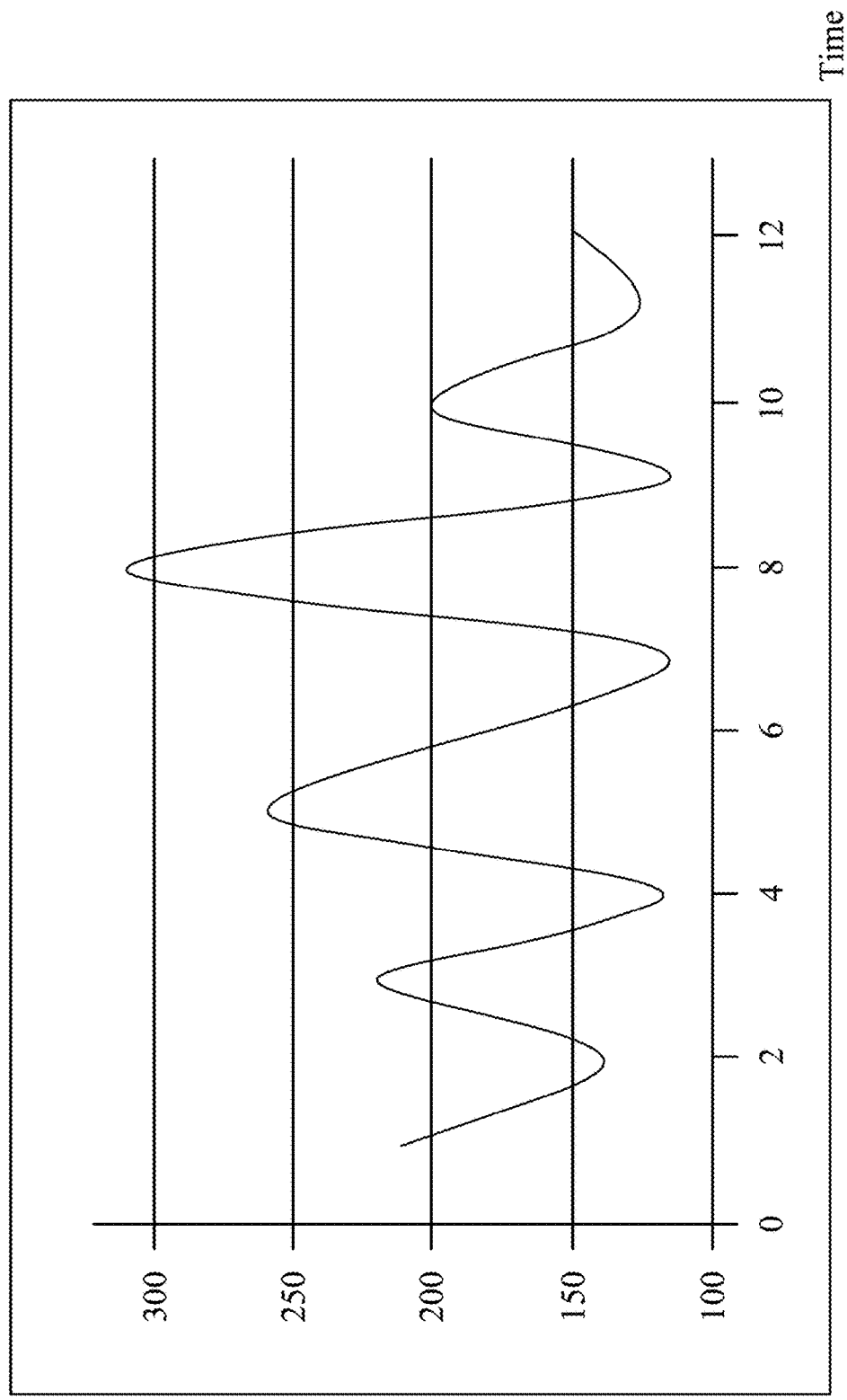
FIG. 4 is a schematic diagram illustrating change of the beam amplitude in accordance with an embodiment.
Figure 5:
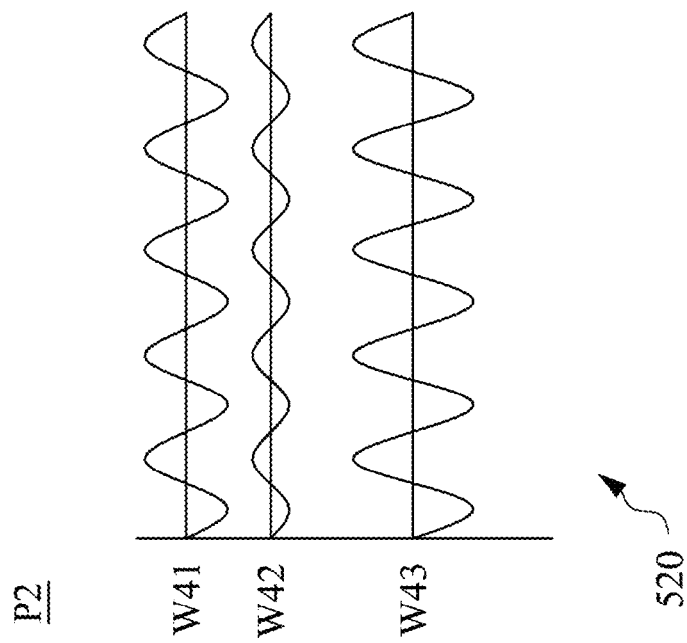
FIG. 5 is a schematic diagram illustrating the mechanism to reduce the interference in accordance with an embodiment.
Figure 5:
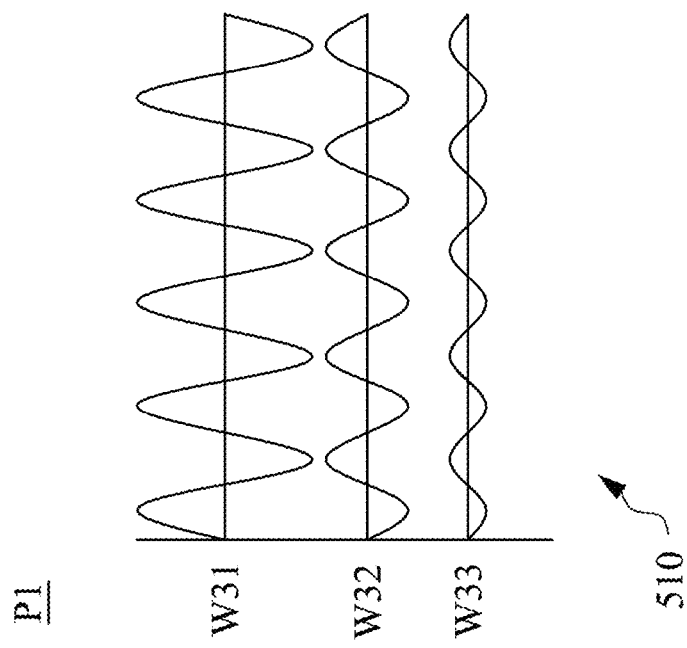

FIG. 4 is a schematic diagram illustrating change of the beam amplitude in accordance with an embodiment. Referring to FIG. 1 and FIG. 4. The horizontal axis of FIG. 4 is time, and the vertical axis is the amplitude (also referred to power) of the beam 111. The image sensor 120 captures an image during the sensing period 410 which may be 1/30 seconds or other length of time. The processor 132 emits a control signal to the driving circuit 131 to determine the amplitude of the beam. As shown in FIG. 4, the amplitude of the beam is constantly altered during the sensing period 410. FIG. 5 is a schematic diagram illustrating the mechanism to reduce the interference in accordance with an embodiment. Referring to FIG. 3 and FIG. 5, in a diagram 510, waves W31 and W32 arrives at the pixel P1. The amplitude of the W31 is different from that of the wave W32. A wave W33 is the sum of the two waves W31 and W32. The processor 132 and the driving circuit 131 do not change the phases of the waves W31 and W32, and therefore the destructive interference still occurs. However, the amplitudes of the waves W31 and W32 are different, and thus the destructive interference is reduced. In other words, the amplitude of the wave W33 is greater than that of the wave W13. On the other hand, in a diagram 520, waves W41 and W42 arrive at the pixel P2. The amplitude of the wave W41 is different from that of the wave W42. The wave W43 is the sum of the two waves W41 and W42. The constructive interference still occurs but is reduced because the amplitudes of the waves W41 and W42 are different. In other words, the amplitude of the wave W43 is smaller than that of the wave W23. That is, either constructive interference or destructive interference is reduced when the amplitude of the beam 111 is altered during the sensing period, and thus the SNR is increased.

Figure 6:
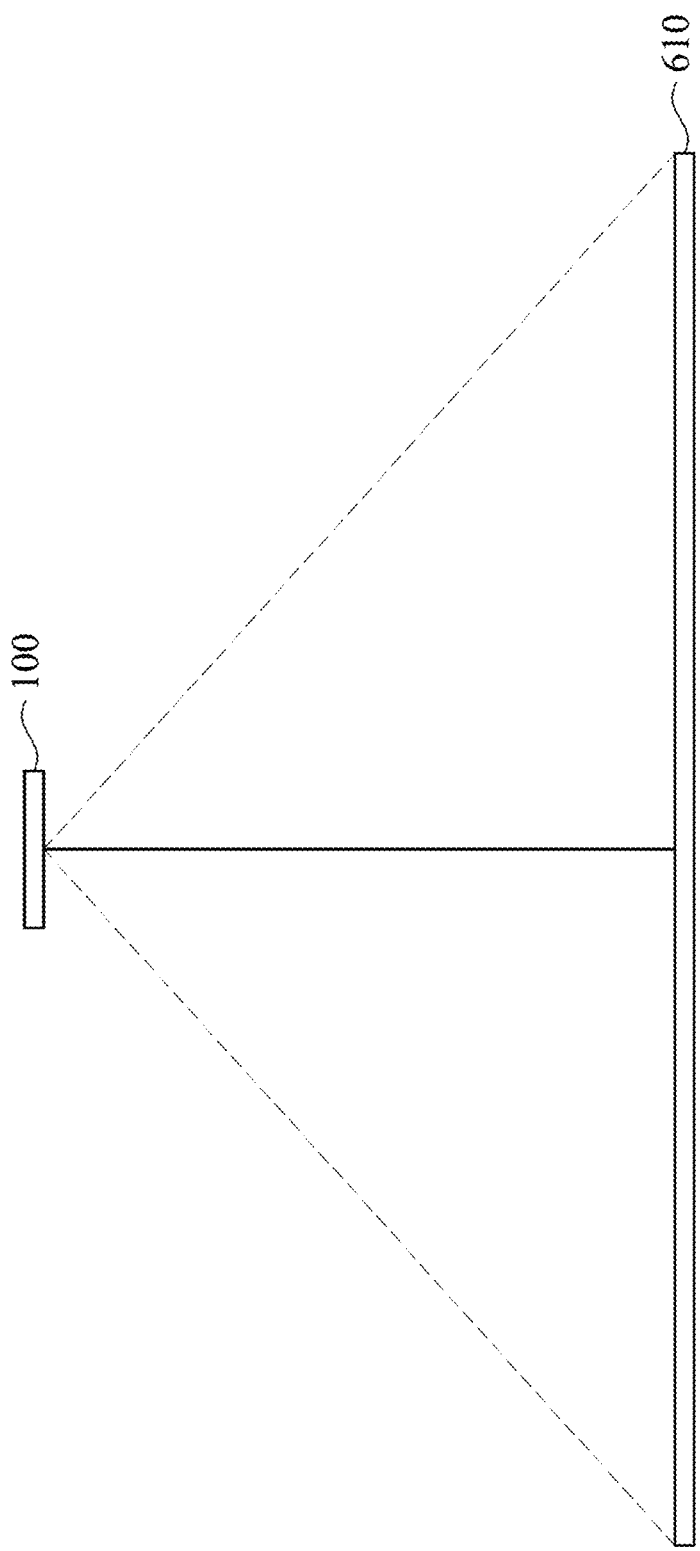
FIG. 6 is a schematic diagram illustrating the configuration for measuring depths of a scatter flat plane in accordance with an embodiment.
Figure 7:
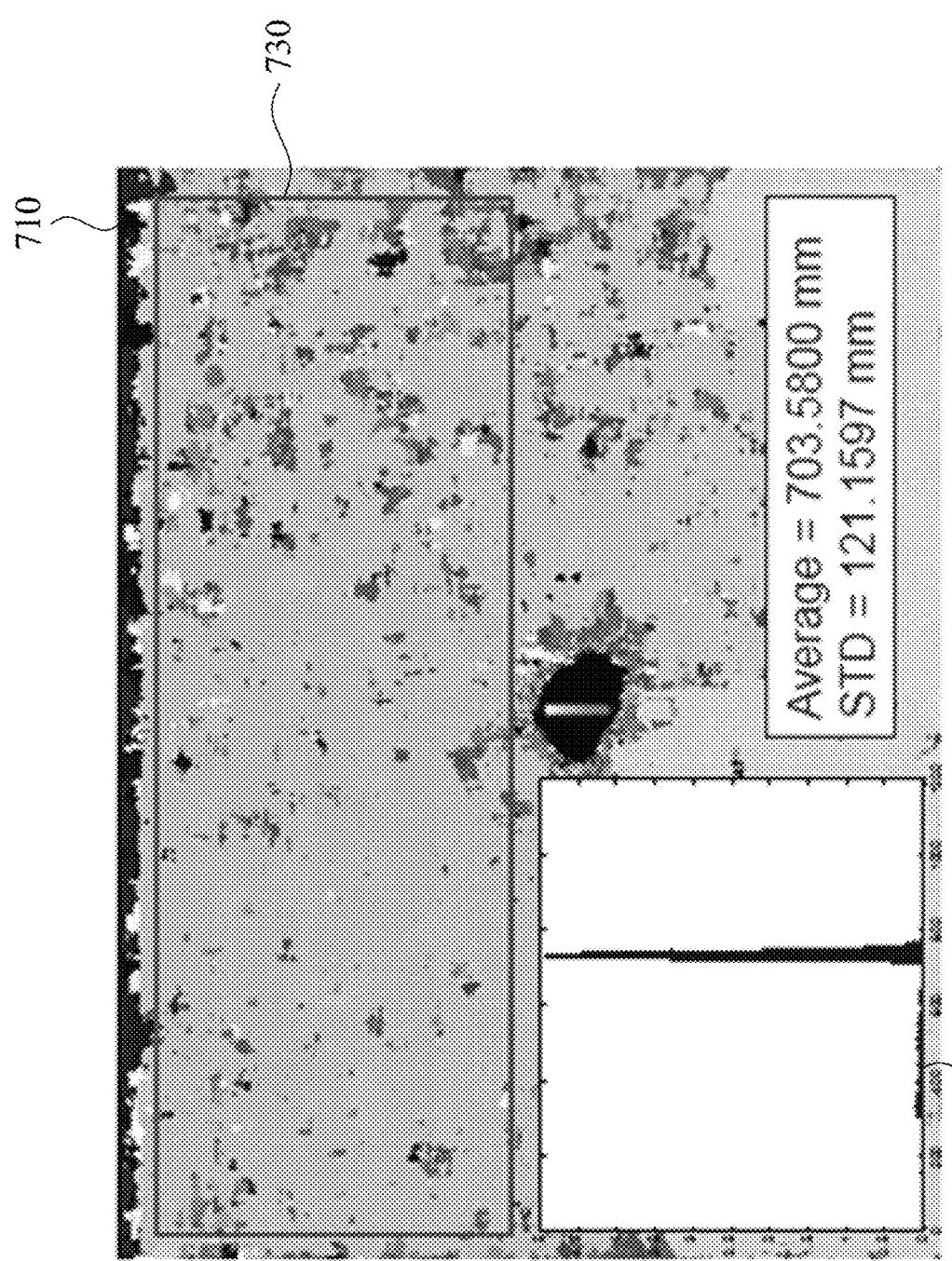
FIG. 7 is a schematic diagram illustrating the measured depths when the beam amplitude is not altered in accordance with an embodiment.
Figure 8:
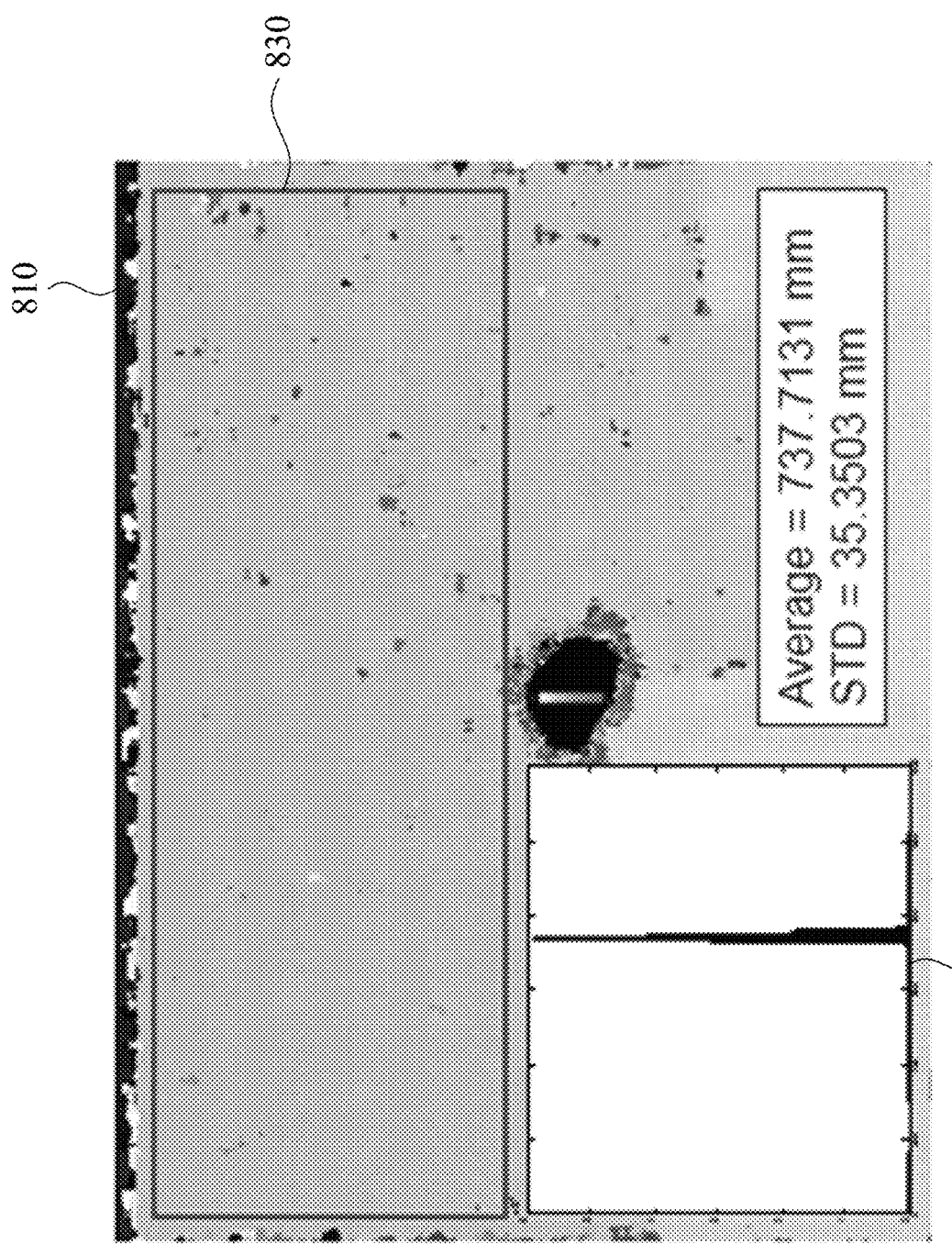
FIG. 8 is a schematic diagram illustrating the measured depths when the beam amplitude is altered in accordance with an embodiment.

The advantages of the mentioned approach will be described by experiment data. FIG. 6 is a schematic diagram illustrating the configuration for measuring depths of a scatter flat plane in accordance with an embodiment. Referring to FIG. 6, the structured light imaging device 100 is used to measure the depths of the scatter flat plane 610. In theory, the depth at every location of the scatter flat plane 610 is identical to each other. FIG. 7 is a schematic diagram illustrating the measured depths when the beam amplitude is not altered in accordance with an embodiment. In FIG. 7, each pixel of an image 710 represents the depth of the scatter flat plane 610 at the corresponding location. A diagram 720 illustrates the histogram of the pixels in an area 730. FIG. 8 is a schematic diagram illustrating the measured depths when the beam amplitude is altered in accordance with an embodiment. Similarly, each pixel of an image 810 represents the depth of the scatter flat plane 610 at the corresponding location. A diagram 820 illustrates the histogram of the pixels in an area 830. It can be seen that the standard variation of the depths in the embodiment of FIG. 8 is smaller than that in the embodiment of FIG. 7 due to the higher SNR.

Referring to FIG. 1, the more times the amplitude of the beam 111 is altered during the sensing period of the image sensor 120 for capturing a picture, the better the interference is reduced. In some embodiments, the processor 132 transmits control signals to the driving circuit 131 at a maximum frequency (e.g. greater than 1 k Hz) allowed by the driving circuit 131 to alter the amplitude of the beam 111. To be specific, the frequency of the processor 132 for transmitting the control signals is limited by the channel between the driving circuit 131 and the processor 132 and by the capability of the driving circuit 131. In the embodiment, the processor 132 transmits a control signal for every x nanosecond, and the image sensor 120 captures an image for every y microsecond where x and y are real numbers greater than 1. That is, the frequency at which the processor 132 transmits the control signals is higher than that the image sensor 120 captures images. The values of x and y are not limited in the invention. On the other hand, the greater the amplitude of the beam 111 is altered, the better the interference is reduced. In some embodiments, the processing circuit 132 alters the amplitude of the beam 111 in a random way during the sensing period. For example, a variable is generated randomly, and the amplitude of the beam is determined according to the variable. However, how the amplitude of the beam is altered is not limited in the invention. As long as the amplitude of the beam changes within the sensing period, it should be within the scope of the present invention.

The image 140 captured by the image sensor 120 is transmitted to the processor 132, which compares the image 140 with a predetermined image to calculate the depths. This predetermined image also has the mentioned special pattern, and therefore the depths can be calculated based on disparities between the predetermined image and the image 140. In some embodiments, the disparities can be calculated by comparing the features in the two images, but the invention does not limit the algorithm for calculating the disparities.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A structured light imaging device, comprising:
a projector comprising a diffractive optical element;
an image sensor; and
a processing circuit electrically connected to the projector and the image sensor,
wherein the processing circuit is configured to control the projector to emit a beam having a special pattern, and alter an amplitude of the beam in a random way during a sensing period,
wherein the image sensor is configured to capture an image corresponding to the beam during the sensing period, and transmits the image to the processing circuit,
wherein the processing circuit calculates a depth according to the image and a predetermined image having the special pattern.

2. The structured light imaging device of claim 1, wherein the projector further comprises:
a projection lens;
a collection lens, wherein the diffractive optical element is disposed between the projection lens and the collection lens;
a beam homogenizer; and
a laser source, wherein the beam homogenizer is disposed between the laser source and the collection lens.

3. The structured light imaging device of claim 1, wherein the processing circuit comprises:
a driving circuit electrically connected to the projector; and
a processor electrically connected to the driving circuit and the image sensor.

4. The structured light imaging device of claim 3, wherein the processor transmits a control signal to the driving circuit to alter the amplitude of the beam at a maximum frequency allowed by the driving circuit.

* * * * *